United States Patent
Reed et al.

(10) Patent No.: US 9,614,683 B1
(45) Date of Patent: Apr. 4, 2017

(54) SIGNED APPLICATION CARDS

(71) Applicant: Quixey, Inc., Mountain View, CA (US)

(72) Inventors: Russel Reed, Redwood City, CA (US);
Eric Glover, Palo Alto, CA (US);
Joseph Barrientos, Sunnyvale, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

(21) Appl. No.: 15/245,422

(22) Filed: Aug. 24, 2016

Related U.S. Application Data

(63) Continuation of application No. 14/984,537, filed on Dec. 30, 2015.

(51) Int. Cl.
| | |
|---|---|
| *H04L 9/32* | (2006.01) |
| *G06F 17/30* | (2006.01) |
| *H04W 12/10* | (2009.01) |
| *G06F 21/64* | (2013.01) |

(52) U.S. Cl.
CPC ...... *H04L 9/3247* (2013.01); *G06F 17/30867* (2013.01); *G06F 21/64* (2013.01); *H04L 9/3263* (2013.01); *H04W 12/10* (2013.01)

(58) Field of Classification Search
CPC .......... H04L 9/3247; H04L 9/3263; G06F 17/30867; G06F 21/64; H04W 12/10
See application file for complete search history.

(56) References Cited

U.S. PATENT DOCUMENTS

| | | | |
|---|---|---|---|
| 6,484,259 B1 * | 11/2002 | Barlow | G06F 21/602 380/30 |
| 6,763,459 B1 * | 7/2004 | Corella | H04L 9/006 713/156 |
| 6,898,707 B1 * | 5/2005 | Sit | G06F 21/602 713/167 |
| 7,565,157 B1 * | 7/2009 | Ortega | H04W 4/02 455/414.3 |
| 7,747,631 B1 * | 6/2010 | Puzicha | G06F 17/30979 707/748 |
| 8,869,305 B1 * | 10/2014 | Huang | G06F 21/604 380/258 |
| 2001/0032204 A1 * | 10/2001 | Hoashi | G06F 17/30699 |
| 2003/0126439 A1 * | 7/2003 | Wheeler | H04L 63/083 713/168 |

(Continued)

*Primary Examiner* — Darren B Schwartz
(74) *Attorney, Agent, or Firm* — Harness, Dickey & Pierce, P.L.C.

(57) ABSTRACT

A device that displays signed application cards. The device receives a card object that includes: an application function identifier that identifies an application function of a native application, a digital signature, and a certificate that comprises a public key. The device verifies the authenticity of the digital signature with the public key in the certificate. The device determines that the certificate is signed by a developer of the native application referenced by the card object. The device renders an application card on the display based on the information included in the card object. The application card includes a text string, an image, an audio, and/or an image. The device overlays an indicator onto the application card. The indicator indicates that the authenticity of the digital signature has been verified. The indicator also indicates that the developer of the native application authorized the rendering of the application card.

20 Claims, 4 Drawing Sheets

(56) References Cited

U.S. PATENT DOCUMENTS

| | | | | |
|---|---|---|---|---|
| 2003/0182552 A1* | 9/2003 | Tanimoto | H04L 9/3265 | 713/170 |
| 2003/0236987 A1* | 12/2003 | Griffin | G06Q 20/105 | 713/189 |
| 2004/0083366 A1* | 4/2004 | Nachenberg | G06F 21/51 | 713/170 |
| 2004/0168083 A1* | 8/2004 | Gasparini | G06F 21/31 | 726/10 |
| 2005/0071328 A1* | 3/2005 | Lawrence | G06F 17/3053 | |
| 2005/0177750 A1* | 8/2005 | Gasparini | G06F 21/31 | 726/5 |
| 2005/0246530 A1* | 11/2005 | Ushiku | G06F 21/51 | 713/168 |
| 2007/0055887 A1* | 3/2007 | Cross | G06F 21/33 | 713/185 |
| 2007/0226793 A1* | 9/2007 | Tanabiki | H04L 9/0825 | 726/21 |
| 2009/0187463 A1* | 7/2009 | DaCosta | G06Q 30/02 | 705/14.58 |
| 2009/0210702 A1* | 8/2009 | Welingkar | H04L 9/321 | 713/156 |
| 2009/0228704 A1* | 9/2009 | de Atley | G06F 8/20 | 713/156 |
| 2010/0198816 A1* | 8/2010 | Kwan | G06F 17/30696 | 707/723 |
| 2010/0268700 A1* | 10/2010 | Wissner | G06F 17/30864 | 707/706 |
| 2012/0084300 A1* | 4/2012 | Oliver | G06F 17/30286 | 707/749 |
| 2012/0204032 A1* | 8/2012 | Wilkins | H04L 9/006 | 713/170 |
| 2013/0326614 A1* | 12/2013 | Truskovsky | G06F 21/44 | 726/19 |
| 2014/0006788 A1* | 1/2014 | Ignatchenko | H04L 63/0428 | 713/175 |
| 2014/0053227 A1* | 2/2014 | Ruppin | G06F 21/10 | 726/1 |
| 2014/0082366 A1* | 3/2014 | Engler | H04L 9/3226 | 713/176 |
| 2014/0082715 A1* | 3/2014 | Grajek | H04L 63/0815 | 726/8 |
| 2014/0181944 A1* | 6/2014 | Ahmed | H04W 12/06 | 726/8 |
| 2015/0095653 A1* | 4/2015 | Shim | G06F 21/125 | 713/181 |
| 2016/0078095 A1* | 3/2016 | Man | G06F 17/30528 | 707/689 |
| 2016/0188730 A1* | 6/2016 | Delli Santi | G06F 17/30867 | 707/728 |

* cited by examiner

SIGNED APPLICATION CARDS

CROSS-REFERENCE TO RELATED APPLICATIONS

The present application is a continuation of U.S. patent application Ser. No. 14/984,537, filed on Dec. 30, 2015. The entire disclosure of the application referenced above is incorporated by reference.

FIELD

This disclosure relates to generating, and rendering signed application cards.

BACKGROUND

Many mobile computing devices can display a graphical user interface that allows a user of the mobile computing device to enter a search query. Upon receiving the search query from the user, the mobile computing device can transmit the search query to a search server. The search server can generate search results based on the search query. Upon generating the search results, the search server can send the search results to the mobile computing device. The mobile computing device receives the search results, and can display the search results on a display of the mobile computing device. Some mobile computing devices can display the search results in the form of a card.

SUMMARY

One aspect of the disclosure provides a card server. The card server may include a network communication device, a storage device, and a processing device. The storage device may store a card data store, and a key data store. The card data store may store card records. A card record may include a card record identifier (ID), and one or more data fields. The key data store may store a plurality of private keys. A private key may be associated with one or more card record IDs. The processing device may execute computer-readable instructions that, when executed by the processing device, cause the processing device to receive a card request. The processing device may receive the card request from a mobile computing device. The card request may include a search query with one or more search terms.

The processing device may generate a consideration set of card records based on the search terms in the search query. The processing device may determine a relevance score for each card record in the consideration set. The processing device may select a card record from the consideration set based on the relevance scores for the card records in the consideration set. The processing device may retrieve the one or more data fields from the selected card record. The processing device may identify a private key in the key data store based on the card record ID of the selected card record. The processing device may generate a digital signature by signing the one or more data fields retrieved from the selected card record with the identified private key. The processing device may generate a card object that comprises the digital signature, and the one or more data fields from the selected card record. The processing device may transmit the card object to the mobile computing device.

Another aspect of the disclosure provides a mobile computing device. The mobile computing device may include a display, a memory (e.g., a non-transitory memory), a transceiver, and a computing processor (e.g., one or more central processing units (CPUs). The memory may store computer-readable instructions, and one or more native applications that are installed at the mobile computing device. The computing processor may execute computer-readable instructions that, when executed by the computing processor, cause the computing processor to generate a card request. The card request may include a search query with one or more search terms. The computing processing can transmit the card request via the transceiver. The computing processor can transmit the card request to a card server.

The computing processor may receive a card object in response to transmitting the card request. The card object may include an application function identifier that identifies an application function in one of the native applications, a digital signature, and a certificate that comprises a public key. The computing processor may determine that the card object includes the digital signature. The computing processor may verify the authenticity of the digital signature with the public key in the certificate. The computing processor may determine that the certificate is signed by a developer of the native application referenced by the card object. The computing processor may render an application card on the display based on the information included in the card object. The application card may include a text string, an image, an audio, and/or an image. The computing processor may overlay an indicator onto the application card. The indicator may indicate that the authenticity of the digital signature has been verified. The indicator may also indicate that the developer of the native application authorized the rendering of the application card.

In some implementations, the certificate may include one or more conditions. In such implementations, verifying the authenticity of the digital signature may include determining that the conditions specified in the certificate are satisfied. In some examples, one of the conditions may specify a value for a data field. In such examples, verifying the authenticity of the digital signature may include determining whether the card object includes the value specified by the condition. In some scenarios, one of the conditions may define a geographic perimeter. In such scenarios, verifying the authenticity of the digital signature may include determining that a geographic location referenced by the card object is within the geographic perimeter defined by the condition.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

The present disclosure provides a system that may be used to render an application card at a mobile computing device.

The mobile computing device may send a card request to a card server. The card request may include a search query. Upon transmitting the card request, the mobile computing device can receive a card object. The card object can include information that the mobile computing device may utilize to render the application card. Additionally, the card object may include a digital signature. The mobile computing device can verify the authenticity of the digital signature. Upon verifying the digital signature, the mobile computing device can overlay an indicator on the application card to indicate the authenticity of the digital signature.

Figure 1:
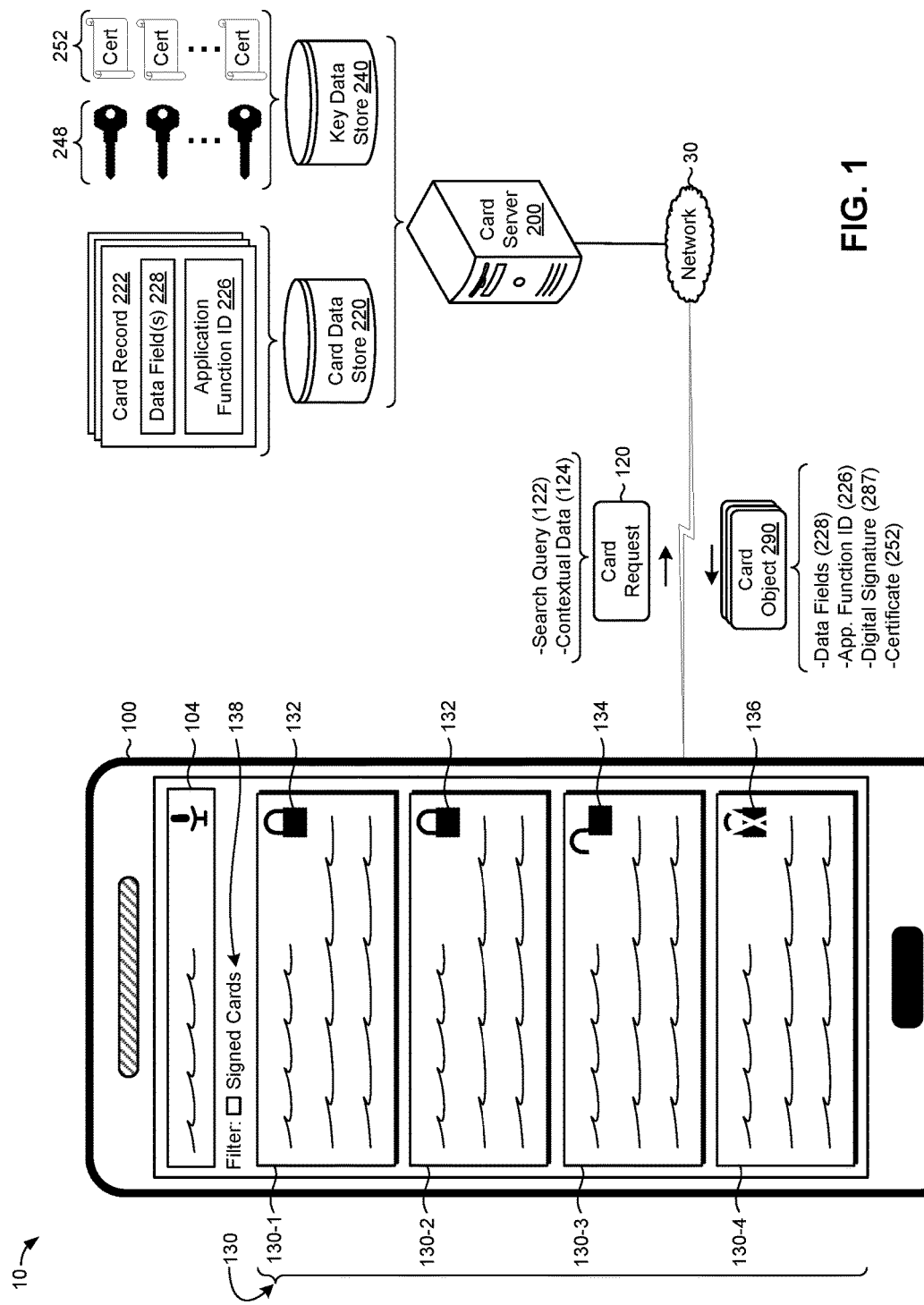
FIG. 1 is a schematic diagram of a system that renders signed application cards at a mobile computing device.

FIG. 1 illustrates a schematic diagram of a system 10 that provides application cards 130 to a mobile computing device 100. The system 10 may include the mobile computing device 100, and a card server 200. The mobile computing device 100, and the card server 200 can communicate via a network 30. The network 30 may include a wireless network (e.g., a cellular network), or a wired network. In operation, the mobile computing device 100 can transmit (e.g., send) a card request 120 to the card server 200. The card request 120 can include a search query 122, and/or contextual data 124 that indicates a context of the mobile computing device 100. In response to transmitting the card request 120, the mobile computing device 100 receives a card object 290 from the card server 200. The card object 290 may include information that the mobile computing device 100 can utilize to render the application card 130.

The card server 200 may include a card data store 220, and a key data store 240. The card data store 220 stores various card records 222. A card record 222 may include information that the card server 200 and/or the mobile computing device 100 can utilize to render the application card 130. For example, a card record 222 may store information regarding a restaurant. A card record 222 may include one or more data fields 228. The data fields 228 may include information that can be displayed via a graphical user interface (GUI) element. For example, a card record 222 for a restaurant may include data fields 228 that store the restaurant name, the restaurant address, the restaurant phone number, etc. A data field 228 may include a text string, an image, a video, and/or an audio.

A card record 222 may also include an application function identifier (ID) 226 that identifies a particular application function within a native application. For example, an application function ID 226 may identify a restaurant search function within a food-ordering application. The application function ID 226 may include a string that identifies the application function, and provides access to the application function. For example, the application function ID 226 may include a uniform resource identifier (URI), a uniform resource locator (URL), and/or an application resource identifier (ARI). The application function ID 226 may be referred to as an access mechanism.

The key data store 240 stores various private keys 248. The key data store 240 may also store certificates 252. Each certificate may be associated with a respective private key 248. Each certificate 252 may include a public key (not shown) that corresponds with the respective private key 248. The card server 200 may generate the private key 248 and its corresponding public key based on a public key cryptography algorithm. The public key cryptography algorithm may utilize integer factorization, discrete logarithms, and/or elliptic curve relationships to generate the private key 248 and its corresponding public key. The card server 200 may randomly (e.g., pseudo-randomly) select a large number (e.g., a large prime number), and utilize a key generation algorithm (e.g., RSA) to generate the private key 248 and its corresponding public key. Each private key 248 may be associated with one or more card records 222, and/or with one or more application function IDs 226.

The card server 200 generates the card object 290 upon receiving the card request 120. To generate the card object 290, the card server 200 may identify a card record 222 from the card data store 220 based on the search query 122. Upon identifying the card record 222, the card server 200 retrieves information from the card record 222. For example, the card server 200 may retrieve the data fields 228, and/or the application function ID 226. The card server 200 can identify a private key 248 that is associated with the identified card record 222. The card server 200 can cryptographically sign a hash of the retrieved information with the private key 248 to generate a digital signature 287. The card server 200 can write the retrieved information, the digital signature 287, and the certificate 252 to a data container that represents the card object 290. Hence, the card object 290 may include the data fields 228, the application function ID 226, the digital signature 287, and the certificate 252.

The mobile computing device 100 receives the card object 290. The mobile computing device 100 can render an application card 130 based on the information included in the card object 290. For example, the mobile computing device 100 can display the data fields 228 on the application card 130. The mobile computing device 100 can utilize the application function ID 226 to display the application card 130. For example, the mobile computing device 100 may display the application function identified by the application function ID 226 within the application card 130.

The mobile computing device 100 may display a signed indicator 132 within an application card 130. The signed indicator 132 may indicate that the digital signature 287 included in the card object 290 is valid. Additionally, the signed indicator 132 may indicate that the certificate 252 has been signed by an entity (e.g., an organization, or a developer) associated with the application function referenced by the application function ID 226. For example, if an application card 130 displays information regarding a hotel, then the signed indicator 132 may indicate that the certificate 252 has been signed by the hotel owner. In the example of FIG. 1, a first application card 130-1, and a second application card 130-2 include the signed indicator 132.

The mobile computing device 100 may display an unsigned indicator 134 within some application cards 130. The unsigned indicator 134 may indicate that the card object 290 that the mobile computing device 100 utilized to render the application card 130 did not include a digital signature 287. In the example of FIG. 1, the third application card 130-3 includes the unsigned indicator 134. In some scenarios, the mobile computing device 100 may filter out application cards 130 that include the unsigned indicator 134. In some examples, the mobile computing device 100 can display a prompt when the user selects an application card 130 that includes the unsigned indicator 134. The prompt may include a warning such as "this card is unsigned", "this card is not from a trusted source", or "this card may not be official".

The mobile computing device 100 may display an invalid signature indicator 136 within some application cards 130. In the example of FIG. 1, the fourth application card 130-4 includes the invalid signature indicator 136. The invalid signature indicator 136 may indicate that the digital signature 287 was not valid. For example, the digital signature 287 may not have been generated with a private key 248 that corresponds with the public key in the certificate 252 included in the card object 290. Additionally or alternatively, the invalid signature indicator 136 may indicate that the certificate 252 has not been signed by an entity associated with the application function that the application function ID 226 identifies. For example, the invalid signature indicator 136 may indicate that the certificate 252 in the card object 290 has not been signed by a developer of the application function. In some examples, the mobile computing device 100 can display a prompt when the user selects an application card 130 that includes the invalid signature indicator 136. The prompt may include a warning such as "this card is not trusted", "this card is not from a trusted source", "this card is not official", or "this card is not authorized".

The mobile computing device 100 may display a signed card option 138. The signed card option 138 may include a user-selectable check box. If the signed card option 138 is selected, then the mobile computing device 100 may only display (e.g., show) application cards 130 that include the signed indicator 132. For example, the mobile computing device 100 may only display the first application card 130-1, and the second application card 130-2. In some implementations, if the signed card option 138 is selected, the mobile computing device 100 may display application cards 130 with the signed indicator 132 and the invalid signature indicator 136 but not application cards 130 with the unsigned indicator 134. For example, the mobile computing device 100 may display the first application card 130-1, the second application card 130-2, and the fourth application card 130-4 but not the third application card 130-3.

Figure 2:
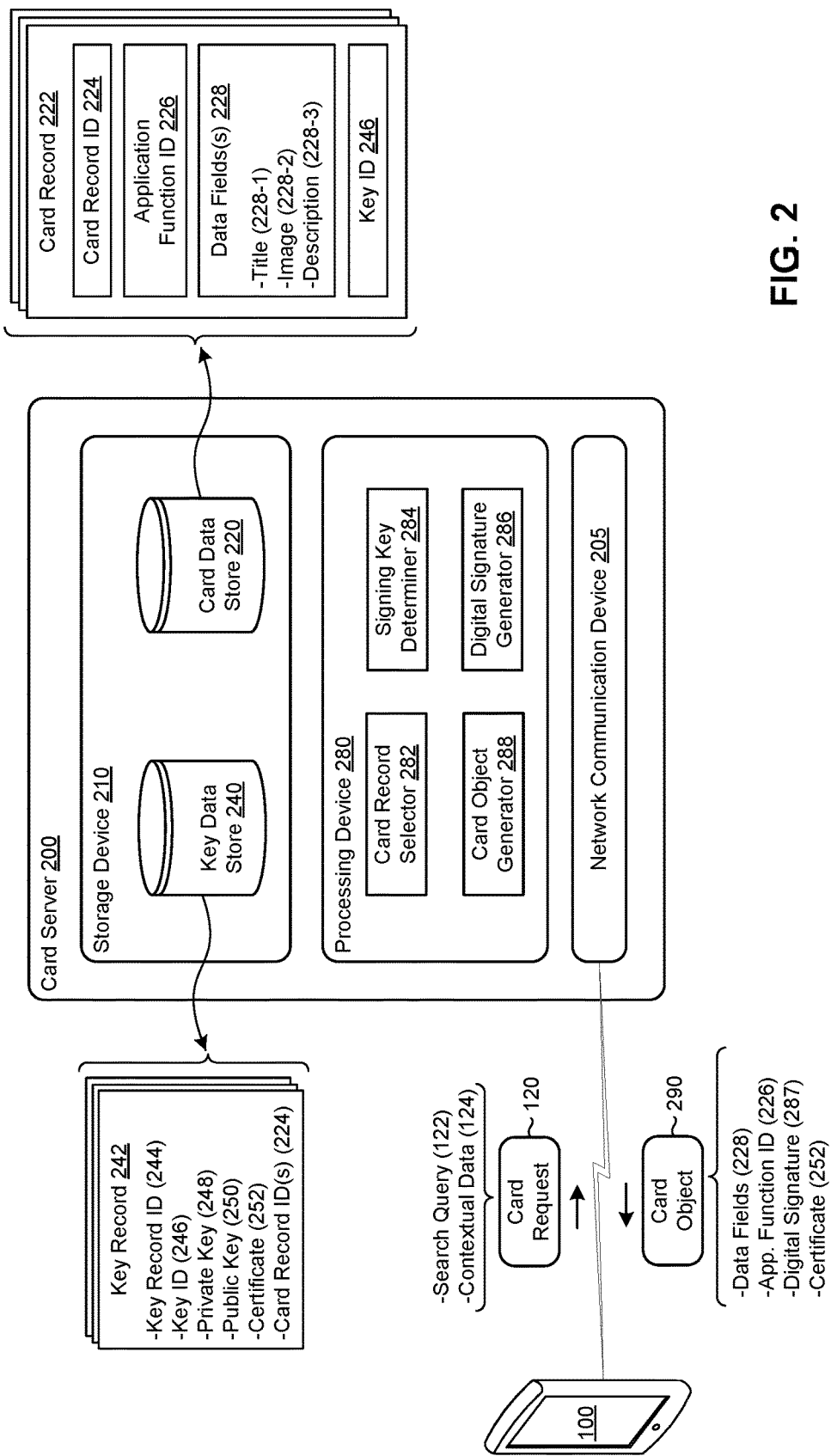
FIG. 2 is a block diagram of a card server that provides the signed application cards to the mobile computing device.

FIG. 2 illustrates an example block diagram for the card server 200. The card server 200 may include a network communication device 205, a storage device 210, and a processing device 280. The card server 200 may be implemented by a cloud computing platform. The cloud computing platform may include a collection of remote computing services. The cloud computing platform may include computing resources (e.g., the processing device 280). The computing resources may include physical servers that have physical central processing units (pCPUs). The cloud computing resources may include storage resources (e.g., the storage device 210). The storage resources may include database servers that support NoSQL, MySQL, Oracle, SQL Server, or the like. The cloud computing platform may include networking resources (e.g. the network communication device 205). Example cloud computing platforms include Amazon Web Services®, Google Cloud Platform®, Microsoft AZURE™ and Alibaba Aliyun™.

The network communication device 205 communicates with a network (e.g., the network 30 shown in FIG. 1). The network communication device 205 may include a communication interface that performs wired communication (e.g., via Ethernet, Universal Serial Bus (USB) or fiber-optic cables). The network communication device 205 may perform wireless communication (e.g., via Wi-Fi, Bluetooth, Bluetooth Low Energy (BLE), Near Field Communications (NFC), ZigBee, a cellular network, or satellites). The network communication device 205 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE), or LTE-Advanced). The transceiver may operate in accordance with a Universal Serial Bus (USB) specification (e.g., via a USB port).

The storage device 210 stores data. The storage device 210 may include one or more computer readable storage mediums. For example, the storage device 210 may include solid state memory devices, hard disk memory devices, optical disk drives, read-only memory, and/or nanotube-based storage devices. The storage device 210 may be connected to the processing device 280 via a bus, and/or a network. Different storage mediums within the storage device 210 may be located at the same physical location (e.g., in the same data center, same rack, or same housing). Different storage mediums of the storage device 210 may be distributed (e.g., in different data centers, different racks, or different housings). The storage device 210 may store a card data store 220, and a key data store 240.

The card data store 220 stores card records 222. The card records 222 store information that can be utilized to display the application cards 130 at the mobile computing device 100. The card records 222 may correspond with application states of various applications. For example, the card records 222 may correspond with application states of native applications that can be installed at mobile computing devices 100. The card records 222 may correspond with application states of web applications (e.g., with webpages of a website). In some implementations, the card records 222 may correspond with advertisements (ads). In such implementations, the card records 222 may be referred to as ad records, and the card data store 220 may be referred to as an ad data store. A card record 222 may include a card record ID 224, an application function ID 226, one or more data fields 228, and/or a key ID 246. The card record ID 224 may include a string that identifies the card record 222.

The application function ID 226 may refer to an application function that corresponds with the card record 222. Specifically, the application function ID 226 may include a string that identifies the corresponding application function, and/or provides access to the corresponding application function. An application function may refer to a capability of an application. For example, a food-ordering application may include an application function that allows a user to search for a restaurant by cuisine, and/or location. An application function may be associated with one or more application states. The application function ID 226 may include a uniform resource identifier (URI) that identifies the corresponding application function. The application function ID 226 may include a uniform resource locator (URL) for the corresponding application function. The URL may include a web URL, or an application URL. The application function ID 226 may include an application resource identifier (ARI) that identifies a resource (e.g., an application function) within an application. The application function ID 226 may be referred to as an access mechanism, for example, because it provides access to a resource (e.g., an application function).

The data fields 228 may store information that the corresponding application state displays. For example, if a card record 222 corresponds with an application state that displays information regarding The Dark Knight movie, then the card record 222 may include data fields 228 for the movie title, the release year, etc. Some of the data fields 228 may store multiple values. Data fields 228 that store multiple values may be referred to as multi-value data fields 228 (e.g., a data field 228 that stores names of actors that were casted in a movie). In the example of FIG. 2, the data fields 228 include a title 228-1, an image 228-2, and a description 228-3.

The key data store 240 may store key records 242. A key record 242 may include a key record ID 244, a key ID 246, a private key 248, a public key 250, a certificate 252, and/or one or more card record IDs 224. The key record ID 244 may include a string that identifies the key record 242. The key ID 246 may include a string that identifies the private key 248. The private key 248, and the public key 250 may be part of a public-key cryptosystem. Specifically, the private key 248, and the public key 250 may refer to a key-pair that the card server 200 may have generated based on an asymmetric key algorithm (e.g., an RSA-based algorithm). The private key 248 may be referred to as a private signing key, and the public key 250 may be referred to as a public verification key. The card server 200 can utilize a private key 248 to generate a digital signature 287, and the mobile computing device can utilize the public key 250 to verify (e.g., validate) the digital signature 287.

The certificate 252 may have been signed by a certification authority. The certification authority may refer to an entity that issues digital certificates. The certificate 252 may certify the ownership of the public key 250. For example, the certificate 252 may certify that an operator of the card server 200 owns the public key 250. The private key 248 and the public key 250 may be associated with one or more card records 222. The key record 242 may include the card record IDs 224 for the card records 222 that are associated with the private key 248 and the public key 250. The card server 200 may utilize the private key 248 to sign the information retrieved from the card records 222 that are associated with the private key 248. In other words, the card server 200 may utilize different private keys 248 to sign information retrieved from different card records 222. Alternatively, the key record 242 may include application function IDs 226 that are associated with the private key 248, and the card server 200 may utilize the private key 248 to sign the application function IDs 226 that are associated with the private key 248.

The certificate 252 may have been signed by an entity associated with a card record 222, and/or an application function. For example, if the card record 222 includes information regarding a hotel, then the certificate 252 may have been signed by the hotel owner. The certificate 252 may have been signed by a developer of the application function referenced by the application function ID 226 in the card record 222. For example, if the card record 222 references a restaurant search function in a food-ordering application, then the certificate 252 may have been signed by the developer of the food-ordering application.

The processing device 280 may include a collection of one or more computing processors that execute computer readable instructions. The computing processors of the processing device 280 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 280 may execute computer-readable instructions that correspond with a card record selector 282, a signing key determiner 284, a digital signature generator 286, and/or a card object generator 288.

The card record selector 282 selects one or more card records 222 from the card data store 220 based on the search query 122. In some implementations, the card data store 220 may include a data structure (e.g., an inverted index) that maps keywords to the card record IDs 224. In such implementations, the card record selector 282 can query the data structure with the search terms of the search query 122. In return, the card record selector 282 can receive the card record ID(s) 224 for the card record(s) 222 that correspond with the search query 122. The card records 222 that correspond with the card record IDs 224 that the card record selector 282 receives may be referred to as a consideration set of card records 222.

In some implementations, the card record selector 282 may tokenize the search query 122 prior to selecting the card records 222 from the card data store 220. Tokenizing the search query 122 may refer to generating parsed tokens from the search terms of the search query 122. The card record selector 282 can use a tokenizer to tokenize the search query 122. The tokenizer can use various techniques to generate the tokens. In some examples, the tokenizer generates the tokens by splitting the characters of the search query 122 with a given delimiter (e.g., " "). The card server 200 can perform various other operations to the search query 122 prior to selecting the card records 222. For example, the card server 200 may perform stemming by reducing the words in the search query 122 to their stem word, or root word. The card server 200 can perform synonymization by identifying synonyms of search terms in the search query 122. The card server 200 may also identify misspelled words, and replace the misspelled words with the correct spelling. Some of the operations described herein may be referred to as 'cleaning' the search query 122.

In some implementations, the card record selector 282 can score the selected card records 222. Scoring the selected card record 222 may refer to generating a relevance score for the selected card record 222. The relevance score for the selected card record 222 may indicate how relevant the selected card record 222 is to the search query 122. The card record selector 282 can compute a set of scoring features for the selected card record 222, and determine a relevance score for the selected card record 222 based on the scoring features. The scoring features may include record scoring features, query scoring features, and/or record-query scoring features.

A record scoring feature may be associated with a card record 222. A record scoring feature may include data associated with an application function (e.g., an application state) that corresponds with the card record 222. For example, a record scoring feature may include values from the one or more data fields 228. A record scoring feature may include parameters related to the application state that corresponds with the card record 222. A record scoring feature may include data that indicates a popularity of the corresponding application state. For example, a record scoring feature may indicate a number of times that the card record 222 has been utilized to generate an application card 130 at a mobile computing device 100. A record scoring feature may indicate a rating of the corresponding application state (e.g., a number of stars associated with the application state). A record scoring feature may include a Boolean value that indicates whether the card record 222 is associated with a key ID 246 for a private key 248. In other words, a record scoring feature for a card record 222 may indicate whether information retrieved from the card record 222 can be signed with a private key 248.

A query scoring feature may be associated with the search query 122. A query scoring feature may include data associated with the search query 122. Example query scoring features may include a number of words in the search query 122, a popularity of the search query 122, and/or an expected frequency of the words in the search query 122. A record-query scoring feature may include data that may be generated based on data associated with the selected card record 222, and the search query 122. A record-query scoring feature may include parameters that indicate a number of matches between the terms of the search query 122, and the selected card record 222.

The card record selector 282 can score the card records 222 based on the scoring features. The card record selector 282 may include a machine learned model(s) (e.g., a supervised learning model). The machine learned model may be configured to receive the scoring features, and score the card records 222 based the scoring features. Specifically, the card record selector 282 may determine a feature vector that includes the record scoring feature(s), the query scoring feature(s), and/or the record-query scoring feature(s). The card record selector 282 may use the feature vector as an input for a machine-learned regression model to calculate a score for the card record 222. The machine-learned regression model may include a set of decision trees (e.g., gradient boosted decision trees). The machine-learned regression model may include a logistic probability formula. A machine learned task can be implemented as a semi-supervised learning task, where a portion of the training data is labeled with human-curated scores, and the remaining training data may be used without human-curated scores.

In some implementations, the card record selector 282 can filter out card records 222 based on the relevance scores for the card records 222. For example, the card record selector 282 can filter out a card record 222, if the relevance score for the card record 222 is below a threshold relevance score. In some implementations, the card record selector 282 may filter out all card records 222 except a threshold number of card records 222 with the highest relevance score. For example, the card record selector 282 may filter out all card records 222 except the card record 222 with the highest relevance score.

In some implementations, the card record selector 282 may select a card record 222 without explicitly receiving the card request 120. For example, the card record selector 282 may periodically select one or more card records 222 based on contextual data associated with the mobile computing device 100. The card record selector 282 may utilize one or more application programming interfaces (APIs) to gather the contextual data associated with the mobile computing device 100. The contextual data may include sensor measurements such as a current location of the mobile computing device 100, an ambient temperature, an ambient lighting level, etc. The contextual data may also include application data associated with native applications that are installed at the mobile computing device 100. For example, the contextual data may include upcoming calendar events, etc.

In some implementations, the card record selector 282 may select a card record 222 that is currently trending. The card data store 220 may store information that indicates the popularity of the card records 222. The card record selector 282 may select the most popular card record 222. Specifically, the card record selector 282 may select the card record 222 with the highest popularity score, of the highest trending score. In some implementations, the card record selector 282 may select a card record 222 based on financial incentives (e.g., bid prices) that are associated with the card record 222. In such implementations, the card records 222 may be referred to as ad records. Moreover, some ad records may be associated with a bid price. The card record selector 282 may select the card record 222 that is associated with the highest bid price.

The signing key determiner 284 identifies a private key 248 for signing the information retrieved from the selected card record 222. The selected card record 222 may include a key ID 246 for a private key 248 that the card server 200 may utilize to sign the information from the card record 222. The signing key determiner 284 can retrieve the key ID 246 from the selected card record 222. In some examples, the card data store 220 may include an inverted index that maps the card record IDs 224 to the key IDs 246. In such examples, the card data store 220 can query the inverted index with the card record ID 224 for the selected card record 222, and receive the key ID 246 for a private key 248 that can be utilized to sign the information from the card record 222. Upon receiving the key ID 246, the signing key determiner 284 can retrieve the corresponding private key 248 from the key data store 240. Alternatively, the signing key determiner 284 may query the key data store 240 with the card record ID 224 for the selected card record 222, and receive the private key 248 that is associated with the card record ID 224.

In some implementations, the signing key determiner 284 may query the key data store 240 with the application function ID 226 associated with the selected card record 222, and receive the private key 248 that is associated with application function ID 226. In some implementations, the signing key determiner 284 may query the key data store 240 with a specific data field 228 (e.g., the title 228-1, and/or the description 228-3). For example, a card record 222 may stores information regarding a hotel. In this example, the title 228-1 may include the hotel name. The hotel name may be associated with a specific private key 248, and the corresponding certificate 252 may have been digitally signed by the hotel owner. In other words, the hotel owner may have acted as a certification authority, and certified the certificate 252 that corresponds with the private key 248 associated with the hotel name. In some implementations, a card record 222 may be associated with multiple private keys 248. In such implementations, the signing key determiner 284 can retrieve all the private keys 248 that are associated with the card record 222. For example, the application function ID 226 may be associated with a first private key 248, and the title 228-1 may be associated with a second private key 248.

The digital signature generator 286 generates the digital signature 287. The digital signature generator 286 can hash the data fields 228, and/or the application function ID 226 from the selected card record 222 to generate a digest. Upon generating the digest, the digital signature generator 286 can sign the digest with the private key 248 identified by the signing key determiner 284. The digital signature generator 286 may utilize any suitable algorithm for hashing the data fields 228, and/or the application function ID 226. For example, the digital signature generator 286 may utilize the MD5 algorithm, the SHA-1 algorithm, or the SHA-2 algorithm for generating the digest. In some implementations, the digital signature generator 286 may generate the digital signature 287 by directly signing the data fields 228, and/or the application function ID 226 (e.g., instead of signing the digest).

The card object generator 288 generates the card object 290. The card object 290 includes information from the selected card record 222. For example, the card object 290 may include the data fields 228, and/or the application function ID 226 from the selected card record 222. The card object 290 may also include the digital signature 287. Moreover, the card object 290 may include the certificate 252 that corresponds with the private key 248 that the card server 200 utilized to generate the digital signature 287. The card object generator 288 can instantiate a data container that represents the card object 290. The data container may include a JSON (JavaScript Object Notation) object, an XML (Extensible Markup Language) file, etc. Upon instantiating the data container, the card object generator 288 can write the data fields 228, the application function ID 226, the digital signature 287, and/or the certificate 252 to the data container. Upon generating the card object 290, the card object generator 288 can transmit the card object 290 to the mobile computing device 100 via the network communication device 205.

Figure 3:
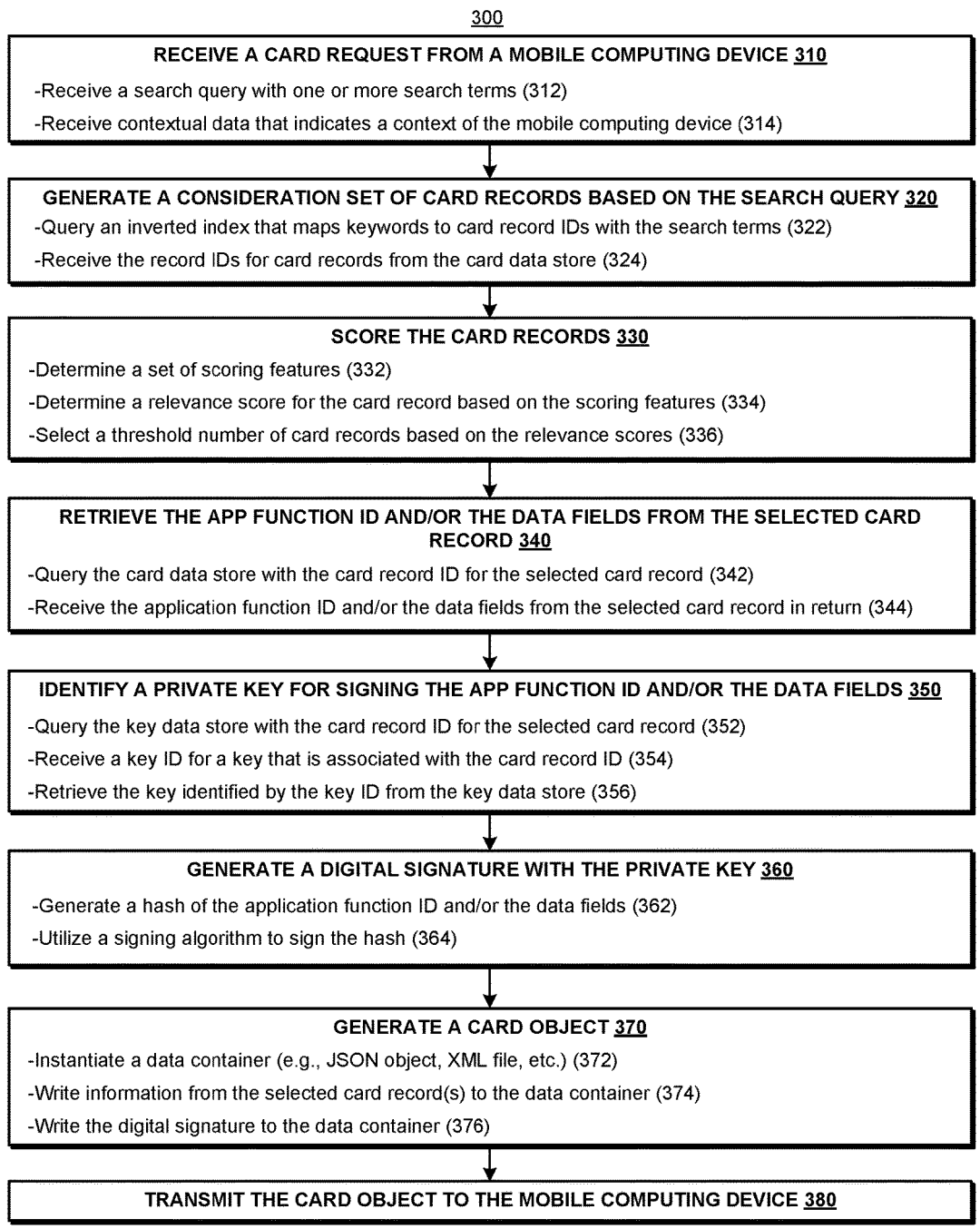
FIG. 3 is a block diagram of a method that the card server can execute to provide signed application cards to the mobile computing device.

FIG. 3 illustrates a method 300 for providing signed application cards. The method 300 can be implemented as a set of computer readable instructions that may be executed by a computing processor of a card server (e.g., the processing device 280 of the card server 200 shown in FIG. 2). Generally, the card server receives a card request from a mobile computing device (at 310). The card request may include a search query. At 320, the card server generates a consideration set of card records from a card data store based on the search terms in the search query. The card server can score the card records in the consideration set, and select one or more card records from the consideration set based on the scores (at 330). At 340, the card server can retrieve an application function ID, and/or one or more data fields from the selected card record. At 350, the card server identifies a private key for generating a digital signature. At 360, the card server generates a digital signature by signing the application function function ID, and/or the data fields from the selected card record with the private key identified at 350. At 370, the card server generates a card object that includes the digital signature, and the application function ID or the data fields from the selected card record. At 380, the card server transmits the card object to the mobile computing device.

At 310, the card server receives a card request from a mobile computing device. Receiving the card request may include receiving a search query with one or more search terms (at 312). The search query in the card request may be referred to as a current search query. Receiving the card request may also include receiving contextual data (at 314). The contextual data may include sensor values (e.g., a location of the mobile computing device), application IDs that identify the native applications that are installed at the mobile computing device, etc.

At 320, the card server generates a consideration set of card records from a card data store based on the search terms in the search query. In some implementations, the card data store may include a data structure that maps keywords to card record IDs that identify the card records. The data structure may include an index (e.g., an inverted index), a lookup table, etc. The card server can query the data structure with the search terms of the current search query (at 322). Upon querying the data structure with the current search query, the card server can receive the card record IDs for card records from the card data store (at 324). The card record IDs that the card server receives identify card records that may be relevant to the current search query. In some implementations, the card server may tokenize the current search query, and/or clean the search query (as described in relation to FIG. 2).

In some implementations, the card server may generate the consideration set based on the contextual data. The card server may utilize the contextual data to generate the consideration set in addition to, or instead of the search query. The card records may be associated with metadata. The card server can include a card record in the consideration set, if the metadata matches the contextual data. For example, a card record may be associated with a location. In this example, the card server may include the card record in the consideration set, if the location associated with the card record is within a threshold distance of the location of the mobile computing device indicated by the contextual data.

At 330, the card server scores the card records in the consideration set. Scoring the card records may include determining a set of scoring features (at 332). Upon determining the scoring features, the card server can determine a relevance score for the card record based on the scoring features (at 334). As described herein, determining the scoring features may include computing a query scoring feature, a record scoring feature, and/or a record-query scoring feature. Determining the relevance score may include utilizing a machine learned model that receives the scoring features for a card record as an input, and outputs the relevance score for the card record. In some implementations, the card server may select a particular number of card records from the consideration set based on the relevance scores of the card records in the consideration set (at 336). For example, the card server may select one, two, or three of the card records with the highest relevance scores.

At 340, the card server retrieves information from the selected card record. The card server can query the card data store with the card record ID for the selected card record (at 342). Upon querying the card data store with the card record ID, the card server may receive information that is stored in the card record (at 344). For example, the card server may retrieve the one or more data fields that are stored in the selected card record. Alternatively or additionally, the card server may retrieve the application function ID from the selected card record.

At 350, the card server identifies a private key for generating a digital signature. As described herein, the card server may include a key data store that stores various private keys. Different private keys may be associated with different card records. The card server can query the key data store with the card record ID for the selected card record (at 352). At 354, the card server may receive a key ID for a private key that is associated with the selected card record. The card server can utilize the key ID to retrieve the private key from the key data store (at 356). If the card server selected multiple card records, then the card server may retrieve multiple private keys.

At 360, the card server generates a digital signature with the private key. The card server may hash the application function ID, and/or the data fields (at 362). Hashing the application function ID, and/or the data fields may result in a digest. The card server may utilize any hashing techniques for generating the digest. For example, the card server may utilize the MD5 algorithm, the SHA-1 algorithm, or the SHA-2 algorithm to generate the digest. Upon generating the digest, the card server can sign (e.g., cryptographically sign) the digest with the private key (at 364). The card server may utilize any signing algorithm for generating the digital signature. For example, the card server may utilize RSA, or any variant thereof to generate the digital signature.

At 370, the card server generates a card object. Generating the card object may include instantiating a data container that represents the card object (at 372). The data container may include a JSON object, an XML file, etc. The card server can write information from the selected card record into the data container (at 374). The information may include the data fields, and/or the application function ID. At 376, the card server writes the digital signature to the card to the data container. At 380, the card server transmits the card object to the mobile computing device.

In some implementations, the card server may transmit multiple card objects to the mobile computing device. Each card object may include a digital signature. The card server may have generated the digital signatures by utilizing different private keys. For example, the card server may generate a first digital signature for a first card object by utilizing a first private key, and a second digital signature for a second card object by utilizing a second private key. In this example, the first card object may include a first application function ID, and the second card object may include a second application function ID. Moreover, the first private key may be associated with the first application function ID, and the second private key may be associated with the second application function ID.

Figure 4:
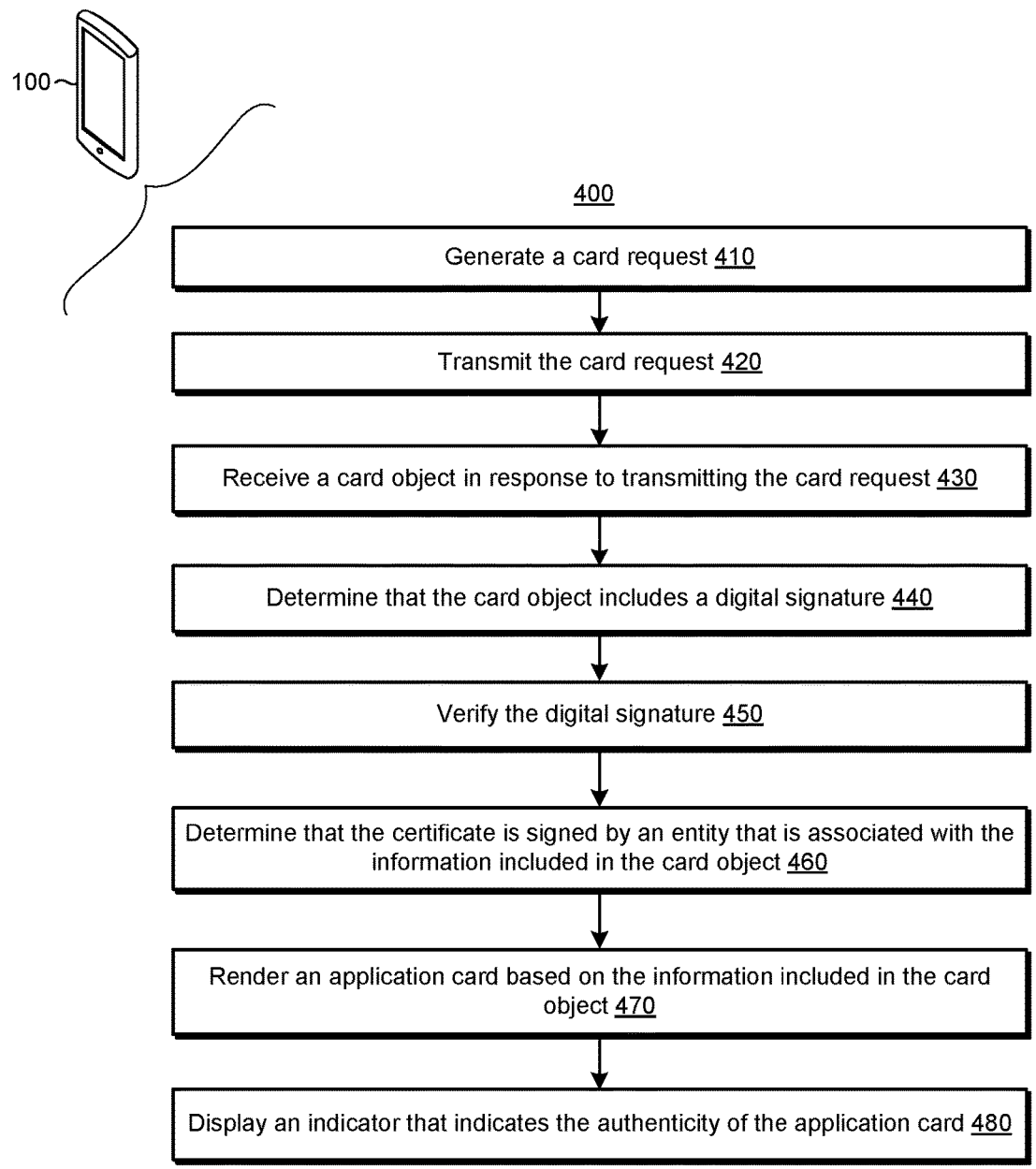
FIG. 4 is a block diagram of a method that the mobile computing device can execute to render the signed application cards.

FIG. 4 illustrates a method 400 for rendering signed application cards. The method 400 can be implemented as a set of computer readable instructions that may be executed by a computing processor of the mobile computing device 100. At 410, the mobile computing device generates a card request. The mobile computing device may generate the card request upon receiving a search query from a user of the mobile computing device. For example, the mobile computing device may detect that the user has entered a search query in a graphical user interface (GUI) element (e.g., a search box) displayed on a touchscreen display of the mobile computing device. The card request may include contextual data such as sensor measurements (e.g., a location of the mobile computing device), and/or application IDs for native applications that are installed at the mobile computing device.

At 420, the mobile computing device transmits the card request via a transceiver of the mobile computing device. The mobile computing device may transmit the card request to a card server. The card server may be part of a search system. At 430, the mobile computing device receives a card object. The mobile computing device may receive the card object in response to transmitting the card request. Alternatively, the mobile computing device may receive the card object without transmitting the card request. For example, the mobile computing device may receive the card object periodically (e.g., once a day), or when a triggering condition is satisfied (e.g., when the mobile computing device is inside a defined geographic perimeter).

At 440, the mobile computing device determines whether the card object includes a digital signature. If the card object includes a digital signature, then the mobile computing device verifies the digital signature (at 450). If the card object includes a certificate, the mobile computing device may retrieve a public key from the certificate, and utilize that public key to verify the digital signature. Alternatively, the mobile computing device may retrieve an application function ID specified in the card object. The mobile computing device may identify a public key that is associated with the application function ID specified in the card object. For example, the mobile computing device may store public keys in association with application function IDs. Alternatively, the mobile computing device can query an external certificate store for a certificate that corresponds with the application function ID indicated by the card object. The mobile computing device can utilize a signature verifying algorithm indicated in the certificate to verify the digital signature.

At 460, the mobile computing device may determine whether the certificate is signed by a particular entity. Specifically, the mobile computing device may determine whether the certificate is signed by an entity that is associated with the information included in the card object. For example, the mobile computing device may determine whether the certificate is signed by a developer of the application function identified in the card object. In some implementations, the card object may include a data field that refers to an organization (e.g., a company). The mobile computing device can determine whether the certificate is signed by an owner of the organization. For example, the card object may include a data field that refers to a chain of restaurants. In this example, the mobile computing device may determine whether the owner of the restaurant chain has signed the certificate.

At 470, the mobile computing device renders an application card based on the information included in the card object. In some implementations, the application card may include a title, an image, and a description that the mobile computing device retrieves from the card object. In some implementations, the mobile computing device may retrieve the application function ID from the card object, and present the application function associated with that application function. Specifically, the mobile computing device may include a card renderer that accepts an application function ID, and renders an application card that corresponds with the identified application function. For example, the mobile computing device can launch a native application directly into the application function identified by the application function ID.

At 480, the mobile computing device displays an indicator on the application card. The indicator may indicate that the card object, which the mobile computing device utilized to render the application card, includes a digital signature. The indicator may indicate that the application card is digitally signed. The indicator may indicate that the mobile computing device successfully verified the digital signature. In other words, the indicator may indicate that the digital signature is valid. The indicator may be a symbol that the mobile computing device can overlay onto the application card. For example, the indicator may include an image (e.g., a lock in a locked state), or a text string (e.g., "signed"). The indicator may include a formatting style for the application card. For example, the indicator may include a background color (e.g., a blue ribbon), a font style (e.g., bold face, all caps, etc.), or the like.

If the card object includes the indicator, the mobile computing device may retrieve the indicator from the card object. Alternatively, the mobile computing device may retrieve the indicator from a memory of the mobile computing device. The mobile computing device may store a signed indicator (e.g., an image of a locked lock), an unsigned indicator (e.g., an image of an unlocked lock), and an invalid signature indicator (e.g., an image of a broken lock). If the digital signature is valid, then the mobile computing device may display the signed indicator. In some implementations, the mobile computing device may display (e.g., may only display) the signed indicator upon verifying that the certificate is signed by a particular entity. For example, the mobile computing device may display (e.g., only display) the signed indicator, if the certificate is signed by a developer of the application function that corresponds with the application card. If the card object does not include a digital signature, the mobile computing device may display the unsigned indicator. If the digital signature is not valid, the mobile computing device may display the invalid signature indicator. In some implementations, the mobile computing device may display the invalid signature indicator, if the certificate is not signed by the application developer (e.g., even if the digital signature is valid).

In some implementations, the mobile computing device may accept a filtering option from a user of the mobile computing device. For example, the filtering option may include a user-selectable option to display signed application cards. The mobile computing device can detect when the signed card option is selected. Upon detecting that the signed card option is selected, the mobile computing device may display application cards with the signed indicator, and not display application cards with the unsigned indicator or the invalid signature indicator.

In some implementations, the indicator may indicate when the digital signature was generated. The card object may include a timestamp that indicates when the digital signature was generated. In some examples, the indicator can include the timestamp. In some scenarios, the indicator may indicate whether the digital signature was generated recently (e.g., within a threshold time period of a current time). If the digital signature was generated recently then the color of the indicator may be green. If the digital signature was generated a long time ago (e.g., more than ten years ago), then the color of the indicator may be red.

In some implementations, the certificate may include one or more conditions. The conditions may indicate scenarios under which a digital signature generated by a corresponding private key is valid. The conditions may be related to the information included in the card object. Specifically, the conditions may be related to the information that is signed. For example, a condition may specify that the card object include a card title field with a specific value. In this example, the mobile computing device can determine whether the card object includes the specific value specified in the certificate. If the card object includes the value specified in the certificate, then the mobile computing device can display the signed indicator. However, if the card object does not include the value specified in the certificate, then the mobile computing device can display the invalid signature indicator.

In some scenarios, a condition may define a geographic perimeter (e.g., a country, a state, a city, etc.). The condition may specify that any geographic locations indicated by the card object be within the geographic perimeter in order for the digital signature to be valid. In such scenarios, the mobile computing device can determine whether the card object refers to any geographic locations. For example, the mobile computing device may determine whether the card object includes a location data field that specifies a geographic location (e.g., a postal address). If the card object includes a location data field, then the mobile computing device can determine whether the location value of the location data field is within the geographic perimeter specified in the certificate. If the location value is within the geographic perimeter specified in the certificate, the mobile computing device can determine that the digital signature is valid. Hence, the mobile computing device may display the signed card indicator in the application card. However, if the location value is outside the geographic perimeter specified in the certificate, then the mobile computing device can determine that the digital signature is invalid. Hence, the mobile computing device may display the invalid signature indicator on the application card.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., LCD (liquid crystal display) monitor, or touch screen for displaying information to the user and optionally a keyboard and a pointing device, e.g., a mouse, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:
1. A card server comprising:
  a network communication device;
  a storage device that stores:
    a card data store that stores card records, wherein each card record comprises a card record identifier (ID) and one or more data fields; and
    a key data store that stores a plurality of private keys, each private key being associated with one or more card record IDs; and
  a processing device that executes computer-readable instructions that, when executed by the processing device, cause the processing device to:
    receive a card request from a mobile computing device, wherein the card request comprises a search query with one or more search terms, wherein the card request includes contextual data from the mobile computing device, and wherein the contextual data includes a current location of the mobile computing device;
generate a consideration set of card records based on the search terms in the search query;
determine a relevance score for each card record in the consideration set;
select a card record from the consideration set based on the relevance scores for the card records in the consideration set;
retrieve the one or more data fields from the selected card record;
identify a private key in the key data store based on the card record ID of the selected card record;
generate a digital signature by signing the one or more data fields retrieved from the selected card record with the identified private key;
generate a card object that comprises the digital signature and the one or more data fields from the selected card record; and
transmit the card object to the mobile computing device.

2. The card server of claim 1, wherein identifying the private key comprises:
querying the key data store with the card record ID of the selected card record; and
receiving the private key associated with the card record ID of the selected card record.

3. The card server of claim 1, wherein generating the digital signature comprises:
generating a hash of the one or more data fields retrieved from the selected card record; and
signing the hash with the identified private key.

4. The card server of claim 1, wherein one of the data fields comprises an application function ID that identifies a function of a native application that is installed on the mobile computing device; and
wherein generating the digital signature comprises signing the application function ID, or a hash of the application function ID with the private key.

5. The card server of claim 1, wherein the key data store further stores a plurality of certificates, each certificate comprises a public key that is associated with one of the private keys; and
wherein the card object comprises the certificate that corresponds with the private key that is utilized to generate the digital signature.

6. The card server of claim 5, wherein the one or more data fields comprise information regarding an application; and
wherein the certificate that corresponds with the private key that is utilized to generate the digital signature has been signed by a developer of the application.

7. The card server of claim 1, wherein generating the consideration set of card records comprises:
querying an inverted index that maps keywords to card record IDs with the search terms of the search query; and
receiving the card record IDs that correspond with the search terms of the search query.

8. The card server of claim 1, wherein determining the relevance score comprises:
computing a set of scoring features for the card record; and
determining the relevance score based on the scoring features.

9. The card server of claim 1, wherein selecting the card record comprises selecting the card record with the highest relevance score.

10. The card server of claim 1, wherein selecting the card record comprises selecting a first card record with the highest relevance score, and selecting a second card record with the second highest relevance score;
wherein identifying the private key comprises identifying a first private key based on a first card record ID for the first card record, and identifying a second private key based on a second card record ID for the second card record; and
wherein generating the digital signature comprises generating a first digital signature by signing one or more data fields from the first card record with the first private key, and generating a second digital signature by signing one or more data fields from the second card record with the second private key.

11. A computer-implemented method comprising:
storing, in a storage device of a card server, a card data store that stores card records, wherein each card record comprises a card record identifier (ID) and one or more data fields; and
storing, in the storage device, a key data store that stores a plurality of private keys, each private key being associated with one or more card record IDs;
receiving, via a network communication device of the card server, a card request from a mobile computing device, wherein the card request comprises a search query with one or more search terms, wherein the card request includes contextual data from the mobile computing device, and wherein the contextual data includes a current location of the mobile computing device;
generating, at a processing device of the card server, a consideration set of card records based on the search terms in the search query;
determining, at the processing device, a relevance score for each card record in the consideration set;
selecting, by the processing device, a card record from the consideration set based on the relevance scores for the card records in the consideration set;
retrieving, by the processing device, the one or more data fields from the selected card record;
identifying, by the processing device, a private key in the key data store based on the card record ID of the selected card record;
generating, at the processing device, a digital signature by signing the one or more data fields retrieved from the selected card record with the identified private key;
generating, at the processing device, a card object that comprises the digital signature and the one of more data fields from the selected card record; and
transmitting, via the network communication device, the card object to the mobile computing device.

12. The computer-implemented method of claim 11, wherein identifying the private key comprises:
querying the key data store with the card record ID of the selected card record; and
receiving the private key associated with the card record ID of the selected card record.

13. The computer-implemented method of claim 11, wherein generating the digital signature comprises:
generating a hash of the one or more data fields retrieved from the selected card record; and
signing the hash with the identified private key.

14. The computer-implemented method of claim 11, wherein one of the data fields comprises an application function ID that identifies a function of a native application that is installed on the mobile computing device; and wherein generating the digital signature comprises signing the application function ID, or a hash of the application function ID with the private key.

15. The computer-implemented method of claim 11, wherein the key data store further stores a plurality of certificates, each certificate comprises a public key that is associated with one of the private keys; and wherein the card object comprises the certificate that corresponds with the private key that is utilized to generate the digital signature.

16. The computer-implemented method of claim 11, wherein selecting the card record comprises selecting a first card record with the highest relevance score, and selecting a second card record with the second highest relevance score;

wherein identifying the private key comprises identifying a first private key based on a first card record ID for the first card record, and identifying a second private key based on a second card record ID for the second card record; and wherein generating the digital signature comprises generating a first digital signature by signing one or more data fields from the first card record with the first private key, and generating a second digital signature by signing one or more data fields from the second card record with the second private key.

17. A mobile computing device comprising:

a display;

a non-transitory memory that stores computer-readable instructions, and one or more native applications that are installed at the mobile computing device;

a transceiver; and a computing processor that executes computer-readable instructions that, when executed by the computing processor, cause the computing processor to:

gather contextual data of the mobile computing device, wherein the contextual data includes a physical property of the mobile computing device;

generate a card request that includes (i) a search query with one or more search terms and (ii) the contextual data;

transmit the card request via the transceiver to a remote card server;

receive a card object from the remote card server in response to transmitting the card request, wherein the card object comprises: an application function identifier that identifies an application function in one of the native applications; a digital signature; and a certificate that comprises a public key;

determine that the card object comprises the digital signature;

verify authenticity of the digital signature with the public key in the certificate;

determine that the certificate is signed by a developer of the native application referenced by the card object;

render an application card on the display based on the information included in the card object, the application card comprises a text string, an image, an audio, and/or an image; and overlay an indicator onto the application card, the indicator indicates that the authenticity of the digital signature has been verified and that the developer of the native application authorized the rendering of the application card.

18. The mobile computing device of claim 17, wherein the certificate comprises one or more conditions; and wherein verifying the authenticity of the digital signature comprises determining that the one or more conditions specified in the certificate are satisfied.

19. The mobile computing device of claim 18, wherein one of the one or more conditions specifies a value for a data field; and wherein verifying the authenticity of the digital signature comprises determining whether the card object includes the value specified by the one or more condition.

20. The mobile computing device of claim 18, wherein one of the one or more conditions defines a geographic perimeter; and wherein verifying the authenticity of the digital signature comprises determining that a geographic location referenced by the card object is within the geographic perimeter defined by the one or more condition.

* * * * *